3,185,649
United States Patent Office
Patented May 25, 1965

3,185,649
BLEACHING COMPOSITIONS
George Charlesworth Hampson, Neston, Wirral, and William Rickatson, Bebington, England, assignors to Lever Brothers Company, New York, N.Y., a corporation of Maine
No Drawing. Filed July 21, 1961, Ser. No. 125,656
Claims priority, application Great Britain, July 28, 1960, 26,360/60
6 Claims. (Cl. 252—99)

This invention relates to bleaching compositions and in particular to detergent compositions capable of bleaching at relatively low temperatures.

Many detergent compositions contain a so-called persalt which provides a satisfactory bleach when the composition is used at or near the boil but which does not act rapidly enough at temperature existing, for example, under normal conditions of use in unheated washing machines (50 to 70° C.) to provide a satisfactory bleach under these conditions. (These substances are believed to be not true persalts but to contain hydrogen peroxide of crystallisation which is liberated when the substances are dissolved in water. They are, therefore, more properly termed peroxyhydrates.) Examples of these compounds are the alkali-metal perborates, percarbonates, perpyrophosphates and persilicates.

Bleaching agents effective at low temperatures are also known. For convenience, these will be referred to hereinafter as low-temperature bleaching agents. A low-temperature bleaching agent may consist essentially of a single component or of more than one component such as, for example, a substance liberating hydrogen peroxide in water, such as a peroxyhydrate, in conjunction with an agent enhancing the bleaching effect of hydrogen peroxide at low temperatures, hereinafter called a low-temperature bleach enhancing agent.

By a "low-temperature bleaching agent" is meant an agent whose stain removal properties at comparatively low washing temperatures are better than those of sodium perborate as measured in the following test.

TEST

White cotton sheeting to be employed in the test is first washed in a 0.5% solution of commercially available soapless detergent powder (built with phosphate and fluorescer) for 10 minutes in a washing machine. This ensures a good white background which assists in the assessment of faint stains. The cloth is rinsed, dried, ironed and divided into pieces approximately 60 cm. x 70 cm.

The cloth is then stained with the following materials. Port wine, Burgundy wine, tea, tomato soup, oxtail soup, blackcurrant juice, tea with milk, tea with milk and sugar, coffee, blackcurrant jam, raspberry jelly, damson juice. Each piece carries a different stain. In all cases a teaspoonful of the staining material is applied. If there is a large proportion of solid matter (e.g., as in jams or certain types of soup) the excess is scraped off with a pallet knife. The stain should be about 15 cm. in diameter.

The staining materials are prepared as follows:

Port
Burgundy
Blackcurrant juice
Blackcurrant jam
Raspberry jelly
Damson juice

These are used as normally available.

Oxtail soup
Tomato soup

A tin of the soup is emptied into a saucepan with one third of a tin of water; the soup is stirred and warmed until the mixture is homogeneous.

Coffee

Boiling water (170 ml.) is poured onto ground coffee (4 g.) and allowed to stand for 10 minutes and then strained through a muslin cloth.

Tea:

Boiling water (425 ml.) is poured onto tea leaves (12 g.) and allowed to stand 30 minutes and then strained through a muslin cloth.

Tea with milk 80 ml. of the strained tea solution taken and 15 ml. fresh milk added.

Tea with milk and sugar 80 ml. of the strained tea, 15 ml. fresh milk and 7.5 g. of sugar are stirred together.

After four days have elapsed the stained cloth is used in the test.

Section 1.—Bleaching performance of ordinary perborated product in a wash-boiler Product:                                             Parts by weight
  Spray-dried detergent powder similar to that given in Example 2 of British Patent No. 836,988 _____ 92
  Sodium perborate _____ 8

Washing procedure: Eight gallons of suds containing 0.4% of the above product (i.e., 0.36% detergent powder and 0.032% sodium perborate) in water of 24° H. are prepared in a wash-boiler at 25° C. One multi-stained test cloth together with 7 lb. of normally soiled articles are immersed in the suds. The temperature of the suds is then raised to boiling point during 60 minutes, the load being turned over every 15 minutes. The temperatures is maintained at the boil for a further ten minutes. The test cloth is then removed, rinsed and dried.

Section 2.—Performance of products containing bleaching agents in washing machine when used at concentrations equivalent to 0.01% available oxygen Product:
  (i) Detergent powder similar to that given in Example 2 of British Patent No. 836,988 plus the bleaching agent to be tested
  (ii) Detergent powder similar to that given in Example 2 of British Patent No. 836,988 plus sodium perborate (control)

Washing procedure: Eight gallons of suds containing 0.36% of the detergent powder and an amount of the bleaching agent sufficient to give a concentration of 0.01% available oxygen or equivalent chlorine are prepared in a paddle-agitated washing machine at 60° C. One multi-stained test cloth together with 7 lb. of normally stained articles are immersed in the suds and agitated for 10 minutes. The test cloth is then removed, rinsed and dried.

Assessment of stain removal: The washed test cloths are examined visually and each residual stain assessed on the following scale:

0=stained removed
½=stain visible with difficulty
1=faint stain
2, 3, 4=increasing degrees of residual stain The totals of the stain scores for each test cloth are compared.

If the score given by Product i in Section 2 is lower than that given by the control and near to or lower than that given by the product in Section 1, the bleaching agent is considered to be a low-temperature bleaching agent.

By a "low-temperature bleach enhancing agent" is meant an agent which, when incorporated in the detergent powder-sodium perborate composition employed in Section 2 of the test results in an improved degree of stain removal in comparison with the detergent powder-sodium perborate composition itself, when the washing procedure of Section 2 is followed.

The satisfactory incorporation of low-temperature bleaching agents in detergent compositions presents serious difficulties; they are generally unstable even in isolation (in particular, where the low-temperature bleaching agent has more than one component these components may react prematurely with one another) and, in detergent products, tend to react with the other components of the composition or with moisture. The present invention is concerned with providing low-temperature bleaching detergent compositions which have improved stability on storage.

The invention provides a detergent composition containing a low-temperature bleaching agent which detergent composition is in the form of a composite tablet wherein the low-temperature bleaching agent or a component thereof is present in a section of the tablet from which is excluded any ingredient of the detergent composition detrimental to the stability of said agent or said component, these latter substances being hereinafter referred to as separated bleaching material.

The different sections of the composite tablet may be of any form and be associated together in any way to form a unitary tablet. Such a tablet may consist, for example, of a core, insert or layer or a number of cores, inserts or layers or a number of large granules or threads embedded in a matrix.

It is immaterial in the present case in which section of the composite tablet the separated bleaching material is included, but as such material normally forms a relatively small proportion of a detergent composition it will normally be included in the core, insert or layer or similar section of the tablet and the active detergent, alkaline salts and the like of the detergent composition will form the matrix of the tablet.

The dimensions of the section containing the separated bleaching material should be such as to secure effective stabilisation. In general, granules of diameter less than 0.25 cm. and threads of diameter less than 0.10 cm. should not be employed if the tablet consists of these embedded in a matrix.

The section containing separated bleaching material may also be coated to increase stabilisation. Suitable coating materials are a paraffin wax or a solid fatty alcohol.

It is also possible that the section containing the separated bleaching material may be in the form of a powder or granulate held within a closed cavity in the tablet and such a powder or granulate is included within the scope of the term insert.

It may be advantageous for the tablet to contain three or more distinct sections, one of which, for example in the case where the low-temperature bleaching agent contains more than one component, contains one of these components, a second another component, and a third the active detergent, alkaline salts and the like of the detergent composition.

It is normally desirable that the water content of the section containing a low-temperature bleaching agent or a low-temperature bleach enhancing agent should be as low as possible but the water content of the other section or sections may generally be different and be governed by factors such as the ease of manufacture and the cohesivity and ease of disintegration of these sections.

The relative size of the different sections of the tablet is not critical. Although, as stated, the separated bleaching material will normally be a relatively small proportion of the total composition, the section containing it may also contain a major proportion of such of the other ingredients of the composition as are not detrimental to the stability of the separated bleaching material on storage, so that it may be the largest section of the tablet. For convenience of manufacture, this is not generally preferred, however.

Examples of simple low-temperature bleaching agents which may be used in the compositions of the invention are: inorganic hypochlorite compounds obtainable in stable solid form such as calcium hypochlorite, lithium hypochlorite and "chlorinated trisodium phosphate" (the sodium hypochlorite/sodium phosphate complex); organic N-chloro compounds, such as dichlorocyanuric acid and its salts, trichlorocyanuric acid, 1:3-dichloro-5:5-dimethyl hydantoin, and Chloramine T; stable or stablised organic peracids or their salts such as percaprylic, dispersebacic and diperbrassylic acids stabilised in the form of their urea adducts according to British Patent No. 847,702 or with a substance such as gelatin according to our co-pending British patent application No. 24,680/59; salts of inorganic peracids, such as potassium permonosulphate, either in the form of the anhydrous salt or the monohydrated salt or stabilised by acid as, for example, in the form of a triple salt consisting of potassium permonosulphate, potassium hydrogen sulphate and potassium sulphate in the approximate molecular ratio of 2:1:1 containing about 4.5% of available oxygen, and inorganic chlorites.

Examples of low-temperature bleach enhancing agents which may be used with hydrogen peroxide-releasing compounds to form low-temperature bleaching agents are: the reactive esters described in British Patent No. 836,988, the reactive amides described in British Patent No. 855,735, and the organic acid anhydrides described in British Patent No. 549,015 and U.S. Patent No. 2,362,401. Suitable low-temperature bleach enhancing agents include sodium p-acetoxybenzene sulphonate, phthalic anhydride and acetylsalicyclic acid.

There may be employed as a hydrogen peroxide-releasing compound any solid compound or mixture which is reasonably stable on storage when due precautions are taken and which in aqueous solution produces hydrogen peroxide. Examples of such sources of hydrogen peroxide are peroxyhydrates of inorganic salts, especially sodium perborate, alkali metal peroxides and urea-hydrogen peroxide.

The core, insert or layer of the composite tablet of the invention is preferably in the form of a solid mass formed by compression. In this case, a suitable disintegrating agent such as dry starch is preferably included therein and lubricants normally employed in making tablets such as talc, mineral oil, hardened vegetable oil, boric acid, stearic acid, soap powder and the like may also be included.

The detergent composition may be any solid composition of a type customarily employed in the art in which the active ingredient is a soap, an anionic synthetic detergent or a non-ionic synthetic detergent or a mixture of these ingredients, and which includes auxiliary materials, of which the various alkali metal phosphates (e.g., tripolyphosphate and higher polyphosphates, hexametaphosphates, pyrophosphates and orthophosphates), alkali metal silicates, sulphates and carbonates, fatty acid alkanolamides, sodium carboxymethyl celluose, optical bleaching agents, perfume and colouring materials, are illustrative but not exhaustive examples. In addition, the disintegrating agents and lubricants normally employed in the manufacture of tablets may be incorporated in the detergent composition. It may be advantageous in some cases to use the more rapidly dissolving types of surface-active agents, especially non-ionic surface-active agents such as the condensation products of ethylene oxide with alkyl phenols, fatty acids, fatty alcohols and the like. The use of such non-ionic detergents may also be advantageous in that they acts as binding agents and reduce any tendency to dust-formation. The amount of low-temperature bleaching agent in the tablet taken as a whole may correspond to any desired proportion of available oxygen or equivalent bleaching material; it will usually be within the range 0.5–2% of available oxygen by weight of the whole tablet composition.

It is essential, however, that the tablet as a whole should be firm. The strength of a conventionally-shaped tablet should desirably be such that when freshly made and placed on its edge on a balance pan and put under stress by the application to its top edge of a steel plate which can be lowered mechanically, a balance reading of between 5 and 15 kg. is given at the breaking point of the tablet. The tablet should disintegrate complete in warm water in the course of a few minutes. For this purpose it may be necessary to modify somewhat the form of a normal detergent composition. In particular, it may be advantageous to granuate coarsely the whole composition or some of its ingredients, especially some of the inorganic salts, such as, for instance, condensed phosphates, present in the composition before it is compressed into a tablet. This may be effected by any conventional method such as wet or dry granulation, spray-drying, spray-cooling, flaking or extrusion.

In the case of a tablet containing a hydrogen peroxide-releasing compound and a low-temperature bleach enhancing agent it is desirable that the section containing a low-temperature bleach enhancing agent should not disintegrate and dissolve appreciably before the section containing the source of hydrogen peroxide.

The size of the tablets is not critical but should be such that one or more complete tablets are used for the purpose for which the composition is designed. Thus, tablets of the order of 60–70 g. are convenient for use with ordinary domestic washing machines: for the smaller type of washing machine two such tablets would be used and for the larger type, three tablets.

The invention is illustrated by the following examples. In the examples the references to parts and percentages are references to parts and percentages by weight.

EXAMPLE 1

The following example relates to a tablet in which an insert comprising a pellet of a low-temperature bleaching is embedded in a detergent composition.

A granular detergent composition of the following nominal composition was prepared:

| | Parts |
|---|---|
| Sodium dodecylbenzene sulphonate | 12 |
| Sodium toluene sulphonate | 4 |
| Sodium tripolyphosphate | 70 |
| Sodium sulphate | 20 |
| Condensate of nonylphenol with 10 molecular proportions of ethylene oxide | 4 |
| Starch | 5 |
| Talc | 1 |

15 g. of a potassium permonosulphate triple salt preparation consisting of potassium permonosulphate, potassium hydrogen sulphate and potassium sulphate in the approximate molecular ratio of 2:1:1, was compressed into a solid pellet of diameter 3.8 cm. This pellet was then placed centrally in the bottom of a cylindrical die 5.75 cm. diameter which was then charged with 45 g. of the granular detergent powder. A plunger was inserted and the powder compressed with a force of 2,500 kg. into the form of a tablet having a solid adherent insert of low-temperature bleaching agent embedded in one face.

EXAMPLE 2

The following example relates to a tablet in which a pellet of a low-temperature bleach enhancing agent is embedded in a detergent composition containing a hydrogen peroxide-releasing compound.

A granular detergent composition containing 88% of the powder described in Example 1 and 12% of sodium perborate (10.4% available oxygen) was prepared. 6 g. of finely-divided phthalic anhydride (passing a mesh of aperture 251 microns), 0.30 g. of starch and 0.06 of talc were thoroughly mixed then compressed into a pellet of 2.5 cm. diameter. This pellet was centrally placed in the bottom of a 5.75 cm. diameter die which was then charged with 50 g. of the detergent powder/perborate mixture. The contents of the die were then compressed into the form of a tablet having a pellet of phthalic anhydride firmly embedded in one face.

In a composite tablet prepared according to the above method there was no detectable decomposition of the phthalic anhydride after storage for two weeks at 28° C. and 70% relative humidity. In a detergent tablet of similar weight prepared from the same ingredients but in which the phthalic anhydride was not in a separate section of the tablet, 90–100% decomposition of the phthalic anhydride was found after storage for two weeks under similar conditions.

EXAMPLE 3

The following example relates to a tablet in which a pellet of a low-temperature bleach enhancing agent and a pellet of a hydrogen peroxide-releasing compound are embedded in the detergent composition.

A phthalic anhydride pellet of weight 6 g. similar to that described in Example 2 was placed centrally in the bottom of a 5.75 cm. die which was then charged with 45 g. of the spray-dried detergent powder described in Example 1. A perborate pellet of diameter 2.5 cm. made by compressing a mixture of 6 g. of sodium perborate (10.4% available oxygen) and 0.06 g. of talc, was placed centrally on the spray-dried detergent powder. The contents of the die were then compressed to give a composite tablet having a pellet of perborate embedded in one face and a pellet of phthalic anhydride embedded in the opposite face.

EXAMPLE 4

The following example relates to a laminated composite tablet in which a layer of a low-temperature bleach-enhancing agent is pressed onto a detergent composition containing a hydrogen peroxide-releasing compound.

A layer of 6 g. of sodium p-acetoxybenzene sulphonate was added to 50 g. of the granular detergent composition given below and a tablet formed by compression.

| Detergent composition: | Percent |
|---|---|
| Alkyl sulphate (64.7% active detergent) | 23.1 |
| Sodium perborate | 8.0 |
| Alkaline silicate | 6.0 |
| Water | 12.0 |
| Sodium carboxymethylcellulose | 1.0 |
| Sodium tripolyphosphate | 49.9 |

Negligible decomposition was found when tablets of the above composition were stored for one month at 28° C./70% relative humidity and 20° C./90% relative humidity in sealed wax-laminated cartons.

The following results were obtained when detergent tablets of similar weight prepared from the same ingredients but in which the sodium p-acetoxybenzene sulphonate was not in a separate portion of the tablet were stored in similar sealed wax-laminated cartons for four weeks.

| Storage condition | Sodium perborate decomposition, percent | Sodium p-acetoxybenzene sulphonate decomposition, percent |
|---|---|---|
| 20° C./90% RH | 0–20 | 30–50 |
| 28° C./70% RH | 10–20 | 50–60 |

EXAMPLE 5

This example relates to a "current bun" type of tablet.

6 g. of pellets of sodium p-acetoxybenzene sulphonate of approximately 0.5 cm. diameter and 0.3 cm. depth were mixed with 50 g. of the granulated detergent composition given in Example 4 and compressed to form a tablet. Negligible decomposition of the perborate and 10–20% decomposition of the sodium p-acetoxybenzene sulphonate was found after storage of the tablets for four weeks at 20° C./90% relative humidity and 28° C./70% relative humidity, in sealed wax-laminated containers.

EXAMPLE 6

This example relates to a tablet in which threads of a low-temperature bleach enhancing agent are embedded in a detergent composition containing a hydrogen peroxide-releasing compound.

Threads of diameter approximately 0.15 cm. were made by extruding a 70% sodium p-acetoxybenzene sulphonate: 30% coconut ethanolamide mixture through a perforated plate. Tablets were made employing 6 g. of the sodium p-acetoxybenzene sulphonate/coconut ethanolamide thread and 50 g. of the detergent composition given in Example 4.

Storage tests in sealed wax-laminated containers for four weeks gave the following results:

| Storage condition | Sodium perborate decomposition, percent | Sodium p-acetoxybenzene sulphonate composition, percent |
|---|---|---|
| 20° C./90% RH | 0–10 | 10–15 |
| 28° C./70% RH | 0–10 | 30–40 |

What is claimed is:

1. A bleaching and detergent tablet consisting essentially of sodium perborate in an amount sufficient to provide from 0.5 to 2% of available oxygen based on the weight of the tablet and sodium p-acetoxy-benzene sulfonate, the weight ratio of said sulfonate to the perborate being approximately 1:1 to 1.5:1 and the sulfonate being in a section of the tablet which is uncoated and is substantially free of any ingredient of the tablet detrimental to the stability of the sulfonate.

2. A detergent composition according to claim 1 wherein the separated agent is present in a core.

3. A detergent composition according to claim 1 wherein the separated agent is present in a pellet embedded in a face of the tablet.

4. A detergent composition according to claim 1 wherein the separated agent is present in a layer.

5. A detergent composition according to claim 1 wherein the separated agent is present in granules of diameter greater than 0.25 cm.

6. A detergent composition according to claim 1 wherein the separated agent is present in threads of diameter greater than 0.10 cm.

References Cited by the Examiner

UNITED STATES PATENTS

| Re. 24,412 | 12/57 | Hardy | 252—99 |
| 766,254 | 8/04 | Hughes | 252—93 |
| 1,618,323 | 2/27 | Blomstrom | 252—92 |
| 1,854,235 | 4/32 | Stoddard | 252—93 |
| 1,950,956 | 3/34 | Wilhelm | 252—187 |
| 2,110,649 | 3/38 | Frantz | 252—186 XR |
| 2,222,830 | 11/40 | Moss | 252—186 |
| 2,362,401 | 11/44 | Reichert et al. | 252—99 |
| 2,497,057 | 2/50 | Pape et al. | 252—188.3 XR |
| 2,996,431 | 8/61 | Barry | 252—174 |

FOREIGN PATENTS

| 607,971 | 11/60 | Canada. |
| 219,930 | 1/59 | Australia. |
| 512,289 | 8/39 | Great Britain. |

JULIUS GREENWALD, *Primary Examiner.*